United States Patent
Li et al.

(10) Patent No.: US 9,178,845 B2
(45) Date of Patent: Nov. 3, 2015

(54) METHOD, CLIENT DEVICE, SERVER SYSTEM FOR PARSING A DATA USAGE VALUE

(71) Applicant: Tencent Technology (Shenzhen) Company Limited, Shenzhen (CN)

(72) Inventors: Feijun Li, Shenzhen (CN); Shengrong Chen, Shenzhen (CN); Chuhao Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 291 days.

(21) Appl. No.: 13/953,584

(22) Filed: Jul. 29, 2013

(65) Prior Publication Data
US 2014/0032687 A1 Jan. 30, 2014

Related U.S. Application Data

(63) Continuation of application No. PCT/CN2013/079510, filed on Jul. 17, 2013.

(30) Foreign Application Priority Data

Jul. 18, 2012 (CN) .......................... 2012 1 0249236

(51) Int. Cl.
| | |
|---|---|
| *G06F 15/16* | (2006.01) |
| *G06F 15/173* | (2006.01) |
| *H04L 12/58* | (2006.01) |
| *H04W 4/00* | (2009.01) |
| *H04W 4/14* | (2009.01) |

(Continued)

(52) U.S. Cl.
CPC .................. *H04L 51/38* (2013.01); *H04W 4/00* (2013.01); *H04L 41/022* (2013.01); *H04L 41/0226* (2013.01); *H04L 43/0876* (2013.01); *H04L 69/22* (2013.01); *H04M 15/66* (2013.01); *H04W 4/14* (2013.01)

(58) Field of Classification Search
USPC ......... 709/203, 204, 206, 217, 223, 224, 246; 713/152; 717/121; 705/51; 707/792
See application file for complete search history.

(56) References Cited

U.S. PATENT DOCUMENTS 7,954,087 B2 * 5/2011 Zenz et al. .................... 717/121
8,205,010 B1 * 6/2012 Black et al. ................... 709/246

(Continued)

FOREIGN PATENT DOCUMENTS

| CN | 101807273 A | 8/2010 |
|---|---|---|
| CN | 101944094 A | 1/2011 |

(Continued)

OTHER PUBLICATIONS

Tencent Technology, ISROW, PCT/CN2013/079510, Oct. 24, 2013, 12 pgs.

*Primary Examiner* — Quang N Nguyen
(74) *Attorney, Agent, or Firm* — Morgan, Lewis & Bockius LLP

(57) ABSTRACT

The method is performed as a client device and includes receiving a first message that includes a first data usage value. The first message is formatted according to a respective format. After receiving the first message, the method further includes acquiring a data usage template corresponding to the respective format. The method further includes receiving a second message that includes a second data usage value. The second message is formatted according to the respective format. The method further includes parsing the second message according to the data usage template so as to obtain a second data usage value.

8 Claims, 20 Drawing Sheets

(51) Int. Cl.
  *H04L 12/26* (2006.01)
  *H04M 15/00* (2006.01)
  *H04L 12/24* (2006.01)
  *H04L 29/06* (2006.01)

(56) References Cited

U.S. PATENT DOCUMENTS 8,930,276 B2 * 1/2015 Thieme et al. ............... 705/51
2003/0050994 A1 * 3/2003 Pollack ........................ 709/217
2003/0236836 A1 * 12/2003 Borthwick ................... 709/204
2009/0077371 A1 * 3/2009 Powell et al. ................ 713/152
2012/0102095 A1 * 4/2012 Campbell et al. ............ 709/203
2013/0185051 A1 * 7/2013 Buryak et al. ................ 704/2
2015/0169651 A1 * 6/2015 Michael et al. .............. 707/792

FOREIGN PATENT DOCUMENTS

CN   102163353 A   8/2011
CN   102752398 A   10/2012

* cited by examiner

METHOD, CLIENT DEVICE, SERVER SYSTEM FOR PARSING A DATA USAGE VALUE

RELATED APPLICATIONS

This application is a continuation application of PCT Patent Application No. PCT/CN2013/079510, entitled "METHOD, CLIENT DEVICE, SERVER SYSTEM FOR PARSING A DATA USAGE VALUE" filed on Jul. 17, 2013, which claims priority to Chinese Patent Application No. 201210249236.X, entitled "METHOD, TERMINAL AND SERVER FOR PARSING A DATA USAGE VALUE" filed on Jul. 18, 2012, both of which are incorporated by reference in their entirety.

TECHNICAL FIELD

The present invention relates the field of wireless client devices, and particularly, to a method, client device, server and system for parsing a data usage value.

BACKGROUND

With the development of message analysis technology, more and more data information can be acquired by analyzing message contents. For example, a client device such as a cellular telephone can acquire a message from an operator (e.g., a cellular service provider) that contains information regarding the user's data usage. To do so, the user will typically send a request to the operator, and receive a data usage message in return. The data usage message is parsed to determine one or more data usage values (e.g., "used data," "remaining data," etc.) that are contained in the message (e.g., as strings). Thus, the operator is able to provide a data usage query service to the user.

In conventional methods of providing a data usage query service, the data usage message is parsed by a server. The server acquires beforehand and stores templates corresponding to respective formats of data usage messages from various respective operators. The client device uploads the data usage messages to the server as they are received from the operator. The server parses the data usage messages (which include a data usage value) according to the stored templates and returns the data usage value to the client device.

Problematically, these conventional methods require the client device to be connected to the server each time a data usage message is to be analyzed. Moreover, when an operator changes the respective format of their data usage messages, parsing errors are likely to occur.

SUMMARY

To address the aforementioned problems, some implementations provide computer-implemented method. The method is performed as a client device and includes receiving a first message that includes a first data usage value. The first message is formatted according to a respective format. After receiving the first message, the method further includes acquiring a data usage template corresponding to the respective format. The method further includes receiving a second message that includes a second data usage value. The second message is formatted according to the respective format. The method further includes parsing the second message according to the data usage template so as to obtain the second data usage value.

In some implementations, acquiring the data usage template corresponding to the respective format includes analyzing the first message to obtain the data usage template.

In some implementations, acquiring the data usage template corresponding to the respective format includes sending the first message to a server for the server to analyze the first message so as to obtain the data usage template, and receiving, at the client device, the data usage template returned by the server.

In some implementations, analyzing the first message so as to obtain the data usage template includes determining whether an existing data usage template that corresponds to the respective format is stored in memory on the client device. In accordance with a determination that an existing data usage template corresponding to the respective format is stored in memory on the client device, the method further includes using the existing data usage template as the data usage template corresponding to the respective format. In accordance with a determination that no existing data usage template corresponding to the respective format is stored in memory on the client device, the method further includes generating the data usage template corresponding to the respective format.

In some implementations, generating the data usage template corresponding to the respective format includes identifying a string within the first message that indicates the presence of the first data usage value. Generating the data usage template further includes acquiring a location of the string within the first message, and identifying within the string at least one of: a template prefix, a template suffix, a template unit and a template type. The template prefix is a first portion of the string that is located before the data usage value, the template suffix is a second portion of the string that is located after the data usage value, the template unit is a unit of measurement by which the data usage value is measured. The template type comprises one of: an amount of data remaining, an amount of data used, and a total amount of data.

In some implementations, the method further includes storing the generated data usage template in memory on the client device.

To address the aforementioned problems, some implementations provide an electronic device. The electronic device includes one or more processors, memory, and one or more programs stored in the memory and configured to be executed by the one or more processors. The one or more programs include instructions that when executed by the one or more processors cause the device to receive a first message that includes a first data usage value. The first message is formatted according to a respective format. The instructions further cause the device to, after receiving the first message, acquire a data usage template corresponding to the respective format, and receive a second message that includes a second data usage value. The second message is formatted according to the respective format. The instructions further cause the device to parse the second message according to the data usage template so as to obtain the second data usage value.

In some implementations, the instructions further cause the device to analyze the first message to obtain the data usage template.

In some implementations, the instructions further cause the device to send the first message to a server for the server to analyze the first message so as to obtain the data usage template. The instructions further cause the device to receive the data usage template returned by the server.

In some implementations, analyzing the first message so as to obtain the data usage template includes determining whether an existing data usage template that corresponds to the respective format is stored in memory on the device. In accordance with a determination that an existing data usage template corresponding to the respective format is stored in memory on the device, analyzing the first message includes using the existing data usage template as the data usage template corresponding to the respective format. In accordance with a determination that no existing data usage template corresponding to the respective format is stored in memory on the device, analyzing the first message includes generating the data usage template corresponding to the respective format.

In some implementations, generating the data usage template corresponding to the respective format includes identifying a string within the first message that indicates the presence of the first data usage value, acquiring a location of the string within the first message, and identifying within the string at least one of: a template prefix, a template suffix, a template unit and a template type. The template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

In some implementations, the instructions further cause the device to store the generated data usage template in memory on the device.

To address the aforementioned problems, some implementations provide a computer-implemented method. The method is performed at a server and includes receiving a message that includes a data usage value sent by a client device. The message is formatted according to a respective format. The method further includes analyzing the message so as to obtain a data usage template corresponding to the respective format and sending the data usage template to the client device, thereby providing the data usage template to the client device in order for the client device to parse a subsequently received message containing a second data usage value according to the data usage template, so as to obtain the second data usage value.

In some implementations, analyzing the message further includes determining whether an existing data usage template that corresponds to the respective format is stored in memory on the server. In accordance with a determination that an existing data usage template corresponding to the respective format is stored in memory on the server, the method further includes using the existing data usage template as the data usage template corresponding to the respective format. In accordance with a determination that no existing data usage template corresponding to the respective format is stored in memory on the server, the method further includes generating the data usage template corresponding to the respective format based on content of the message.

In some implementations, generating the data usage template corresponding to the respective format based on content of the message includes identifying a string within the message that indicates the presence of a data usage value, acquiring a location of the string within the message, and identifying within the string at least one of: a template prefix, a template suffix, a template unit and a template type. The template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

In some implementations, the method further includes storing the generated data usage template in memory on the server.

To address the aforementioned problems, some implementations provide a non-transitory computer readable storage medium. The non-transitory computer readable storage medium stores one or more programs which include instructions that, when executed by an electronic device with one or more processors and memory, cause the device to receive a first message that includes a first data usage value. The first message is formatted according to a respective format. After receiving the first message, the instructions cause the device to acquire a data usage template corresponding to the respective format and receive a second message that includes a second data usage value. The second message is formatted according to the respective format. The instructions further cause the device to parse the second message according to the data usage template so as to obtain the second data usage value.

In some implementations, the instructions further cause the device to analyze the first message to obtain the data usage template.

In some implementations, the instructions further cause the device to send the first message to a server for the server to analyze the first message so as to obtain the data usage template, and cause the device to receive the data usage template returned by the server.

In some implementations, analyzing the first message so as to obtain the data usage template includes determining whether an existing data usage template that corresponds to the respective format is stored in memory on the device. In accordance with a determination that an existing data usage template corresponding to the respective format is stored in memory on the device, analyzing the first message includes using the existing data usage template as the data usage template corresponding to the respective format. In accordance with a determination that no existing data usage template corresponding to the respective format is stored in memory on the device, analyzing the first message includes generating the data usage template corresponding to the respective format.

In some implementations, generating the data usage template corresponding to the respective format includes identifying a string within the first message that indicates the presence of the first data usage value, acquiring a location of the string within the first message, and identifying within the string at least one of: a template prefix, a template suffix, a template unit and a template type. The template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

In some implementations, the instructions further cause the device to store the generated data usage template in memory on the device.

BRIEF DESCRIPTION OF DRAWINGS

For a better understanding, reference should be made to the following detailed description taken in conjunction with the accompanying drawings, in which.

Like reference numerals refer to corresponding parts throughout the drawings.

DETAILED DESCRIPTION

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 1:
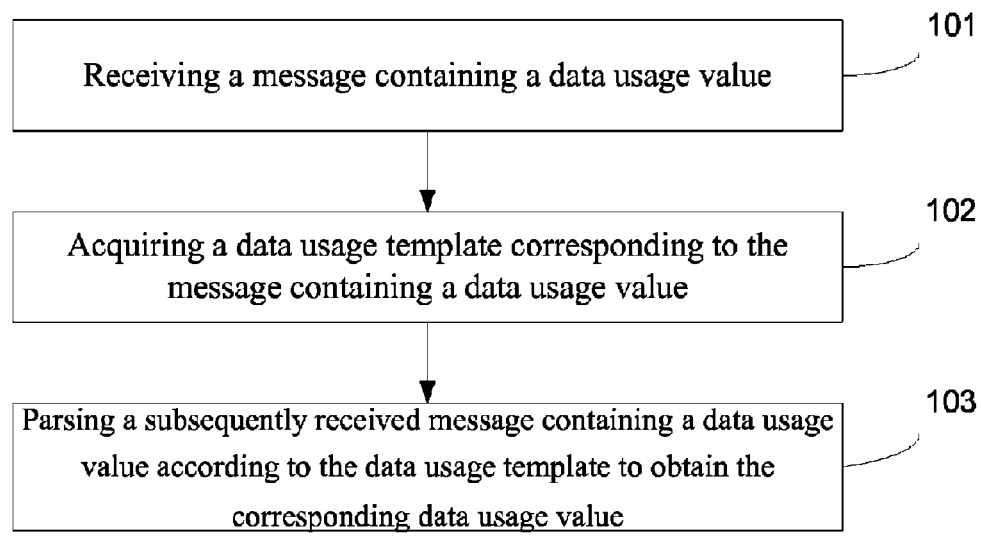
FIG. 1 is a flowchart of a method for parsing a data usage value, in accordance with some implementations.

In order to enable a client device to automatically parse a message containing a data usage value without connecting to the network each time after receiving the message containing a data usage value returned by the operator so as to obtain a corresponding data usage value, some implementations provide a method 100 for parsing a data usage value. The method 100 can be performed at the client device side independently of a server. Referring to FIG. 1, the flow of the method 100 is as follows:

101: the client device receives a message containing a data usage value;

102: the client device acquires a data usage template corresponding to the data usage value containing message.

In some implementations, acquiring a data usage template corresponding to the data usage value containing message comprises analyzing the data usage value containing message to obtain a corresponding data usage template.

Alternatively, in some implementations, acquiring a data usage template corresponding to the data usage value containing message comprises sending the data usage value containing message to a server, so that the server will analyze the data usage value containing message to obtain a corresponding data usage template, and receiving a corresponding data usage template returned by the server.

The flow of the method 100 continues as follows:

103: the client device parses a subsequently received message containing a data usage value according to the data usage template, so as to obtain a corresponding data usage value.

Figure 2:
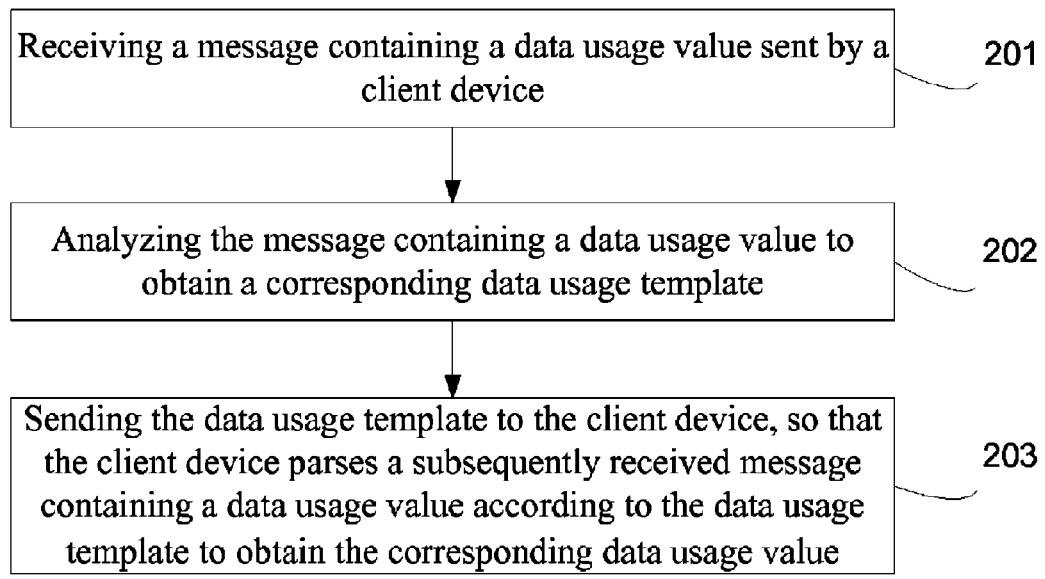
FIG. 2 is a flowchart of a method for parsing a data usage value, in accordance with some implementations.

Some implementations provide a method 200 for parsing a data usage value. The method 200 can be performed by the interaction of a server and a client device, and referring to FIG. 2, the flow of the method 200 is as follows:

201: the server receives a message containing a data usage value sent by the client device;

202: the server analyzes the data usage value containing message to obtain a corresponding data usage template; and

203: the server sends the data usage template to the client device, so that the client device can parse a subsequently received message containing a data usage value according to the data usage template, so as to obtain a corresponding data usage value.

Furthermore, regardless of whether the client device analyzes the data usage value containing message to obtain a corresponding data usage template (e.g., method 100) or the server analyzes the data usage value containing message to obtain a corresponding data usage template (method 200), some implementations optionally include determining whether or not there is a data usage template matching the data usage value containing message in pre-stored data usage templates. When then there is a data usage template matching the data usage value containing message in pre-stored data usage templates, some implementations optionally include using the matching data usage template as the data usage template corresponding to the data usage value containing message. Conversely, where there is not a data usage template matching the data usage value containing message in pre-stored data usage templates, some implementations optionally include generating a corresponding data usage template according to the content of the data usage value containing message.

Furthermore, in some implementations, generating a corresponding data usage template according to the content of the data usage value containing message includes analyzing the data usage value containing message so as to obtain a string in the data usage value containing message and acquiring the location of the string in the data usage value containing message; and obtaining the data usage template by analyzing the string, the location of the string in the data usage value containing message, the message contents of before and after the string and the locations thereof in the data usage value containing message. The data usage template at least comprises a template prefix, a template suffix, a template unit and a template type. The template prefix is the content located before the data usage value, the template suffix is the content located after the data usage value, the template unit is the unit of the data usage value, and the template type at least comprises one of remaining data, used data, and total data.

Furthermore, after generating a corresponding data usage template according to the content of the data usage value containing message, in some implementations, method 100/200 further comprises storing the generated data usage template (e.g., in memory as a pre-stored data usage template).

Furthermore, before determining whether or not there is a data usage template matching the data usage value containing message in the pre-stored data usage templates, in some implementations, method 100/200 further includes acquiring from the operator a message sample containing a data usage value and analyzing the message sample to obtain and store the corresponding data usage template.

Thus, according to the method 100/200, by way of analyzing a message containing a data usage value and parsing a subsequently received message containing a data usage value according to the data usage template obtained by analysis to obtain a corresponding data usage value, the subsequently received message containing a data usage value can be analyzed according to the data usage template without connecting to the network. Therefore, the operation costs can be reduced and the reliability in parsing a data usage value can be improved without depending upon the data usage value expressions of the operators.

Figure 3:
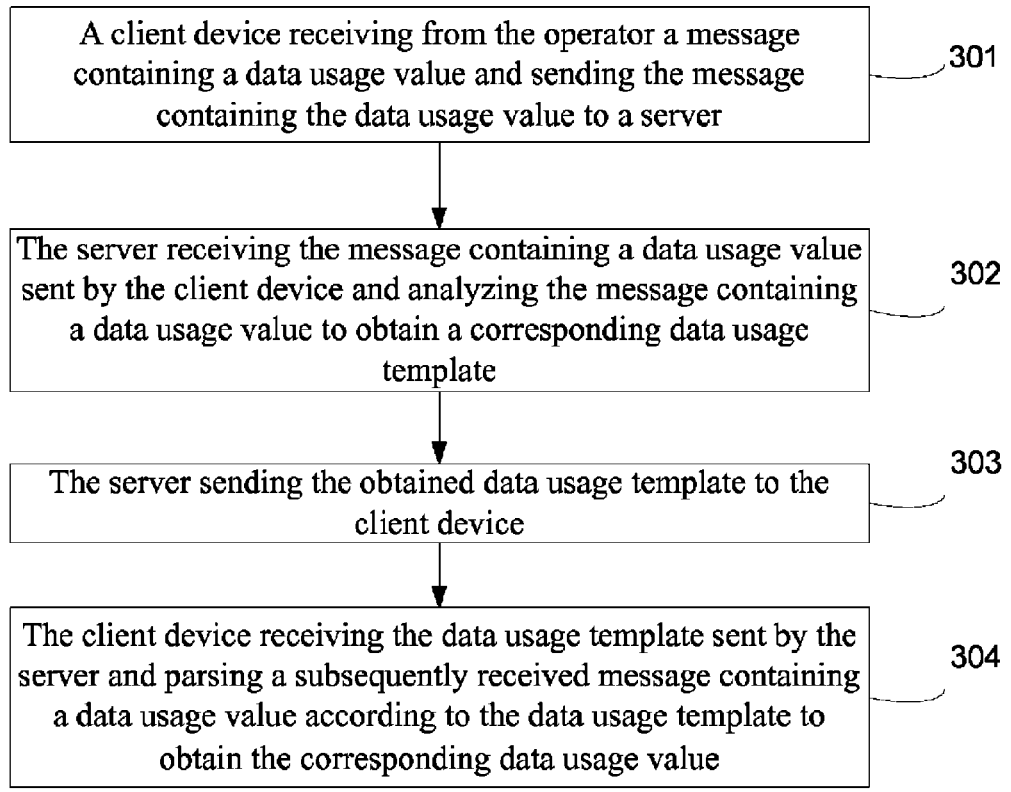
FIG. 3 is a flowchart of a method for parsing a data usage value, in accordance with some implementations.

In order to enable a client device to automatically parse a message containing a data usage value without connecting to the network each time after receiving a message containing a data usage value returned from the operator so as to obtain a corresponding data usage value, some implementation provide a method 300 for parsing a data usage value. Referring to FIG. 3, the flow of the method 300 is as follows:

301: a client device acquires from an operator a message containing a data usage value and sends the data usage value containing message to a server.

In some implementations, prior to acquiring from the operator the data usage value containing message, the method 300 further includes the client device sending a data usage query message to the operator. After the client device has sent a data usage query message to the operator, the operator returns a corresponding message containing a data usage value to the client device (e.g., the message is acquired by the client device) according to the query content in the query message. In order to parse the data usage value in the message, the client device sends the data usage value containing message to the server. One of skill in the art will recognize various ways in which the client device can send a query message to the operator, the operator can return a message containing a data usage value to the client device, and the client device can send the data usage value containing message to the server. Thus, the particular manner in which these operations are performed is not described here. Likewise, the forms and contents of the data usage query message (e.g., the corresponding data structures) sent by the client device to the operator and the data usage value containing message returned by the operator are also known and are therefore not described herein.

In any event, referring again to FIG. 3, the flow of the method 300 continues as follows:

302: the server receives the data usage value containing message sent by the client device and analyzes the data usage value containing message to obtain a corresponding data usage template.

One of skill in the art will recognize various ways in which the server can receive the data usage value containing message sent by the client device, and thus those details are not spelled out here. After receiving the data usage value containing message, the server analyzes the data usage value containing message to obtain a corresponding data usage template and sends the corresponding data usage template to the client device in subsequent operations, so that the client device can automatically analyze the data usage value containing message according to the data usage template.

In some implementations, the server analyzes the data usage value containing message to obtain a corresponding data usage template by first determining whether or not there is a data usage template matching the data usage value containing message in pre-stored data usage templates. If there is, then the server uses the matching data usage template as the data usage template corresponding to the data usage value containing message. Conversely, if there is not, then the server generates the corresponding data usage template according to the content of the data usage value containing message.

The pre-stored data usage templates can be data usage templates obtained by analyzing beforehand message samples corresponding to the messages from the operator. Therefore, before determining whether or not there is a data usage template matching the data usage value containing message in the pre-stored data usage templates, this operation further includes acquiring a message sample containing a data usage value from the operator and analyzing the message sample to obtain and store the corresponding data usage template.

When a corresponding data usage template is generated according to the content of the data usage value containing message, since the message formats of various regions and various operators are different, in order to obtain the data usage template as accurately as possible, an analysis engine is used to analyze the data usage value containing message so as to obtain a specific string that includes a data usage value and acquire the location of the string in the message. A data usage template is obtained according to the string, the location of the string in the message and the contents of string and locations before and after the data usage value (as explained in the example below with reference to TABLE 1).

Furthermore, when the operator changes the message expression, if the server does not store a corresponding data usage template, the server can also directly generate a corresponding data usage template after analyzing the data usage value containing message (e.g., if it is determined that there is no matching data usage template, a corresponding data usage template can be generated in the above-mentioned manner for generating a data usage template in accordance with the content of the data usage value containing message). The server independently generates a corresponding data usage template after analyzing the data usage value containing message. Thus, the method for parsing a data usage value is not limited by the message expressions of the operators, and therefore, the operation costs can be reduced and the reliability in parsing a data usage value can be improved without depending upon the expressions of the data usage value from the operators.

In addition, in order to ensure that the method provided in this implementation can operate normally, if the process of the server generating a data usage template has failed, the server can also record the failure information so as to generate a corresponding data usage template manually and store the data usage template for later use. Moreover, after the server has generated a corresponding data usage template, in order to make sure that the data usage template thus generated can be used on subsequent messages or by other client devices, after generating the corresponding data usage template according to the content of the data usage value containing message, the method 300 further comprises a operation of storing the data usage template thus generated. It can be seen that the data usage templates stored in the server comprises data usage templates directly generated according to the content of the data usage value containing message in addition to data usage templates obtained by the analysis of message samples. As regards the manner for storing the data usage template, all the data usage templates can be store in a template library in a centralized way, or stored separately.

Regardless the type of data usage template, for the convenience of unified management of data usage templates, in the method 300, all the data usage templates can at least comprise a template prefix, a template suffix, a template unit and a template type. The template prefix is the content located before the data usage value, the template suffix is the content located after the data usage value, the template unit is the unit of measurement of the data usage value, and the template type at least comprises one of remaining data, used data, and total data. Possible template units of a data usage include but are not limited to kilobytes (kB), megabyte (MB) and gigabytes (GB), and so on.

For the ease of explanation, the method 300 is now illustrated with reference to the following message containing a data usage value. In some implementations, the message is received by a client device and sent to a server. In some implementations, the server generates a data usage template from the message.

The exemplary message contains the following content:

"Dear user: fixed super-cordless, name of offer: C+mutual fixed call duration accumulated by minutes, offer type: minutes, total volume: 600.00, used volume: 4.00, bonus multimedia content 12 MB, 0 MB used; total GPRS used in June: 200.72 MB,

[1]: your 'flat-rate 500 MB WLAN intra-province data usage for 3 Yuan': remaining WLAN is 81.53 MB (1 MB=1024 kB),

[2]: TD single-mode data usage package (500 MB), remaining data for the current charging month is 499 MB,

[3]: offer sum: 2,097,152 kB (GPRS data usage); offer used: 2,097,152 kB (GPRS data usage),

[4]: used data is as follows: 60 MB data usage experience packet from experience zone in online business hall (charged after free experience for 1 month) (intra-zone surfing data usage), 33.978 MB this month,

[5]: telephone fee gift packet for phone purchase with 0 Yuan (domestic surfing data usage), 5.5 MB used beyond package,

[6]: data usage exempt (MB): total 30, remaining 1.629."

In accordance with the method 300, an example of the analysis process is as follows:

1: Find data usage irrelevant contents according to rules. In this message, "Dear user: fixed super-cordless, name of offer: C+mutual fixed call duration accumulated by minutes, offer type: minutes, total volume: 600.00, used volume: 4.00, bonus multimedia content 12 MB, 0 MB used" is not data usage value information. Thus, only the remaining content will be analyzed during data usage value analysis.

2: Find a first string (e.g., keyword) "MB", obtain a template prefix "total GPRS used in", and then analyze the template prefix and the words there before, and find that what is expressed is "data usage information in June," which is not the desired information. Likewise, it can be determined through analysis that "[1]: your 'flat-rate 500 MB WLAN intra-province data usage for 3 Yuan': remaining WLAN is 81.53 MB (1 MB=1024 kB), [2]: TD single-mode data usage package (500 MB), remaining data for the current charging month is 499 MB" which respectively represent WLAN data usage and TD data usage, and such information need not be taken into account according to the current user activity.

3. Find the next string (e.g., keyword) "kB", and determine that the corresponding content to be analyzed is "[3]: offer sum: 2,097,152 kB (GPRS data usage); offer used: 2,097,152 kB (GPRS data usage)" obtain a first template according to rules: the template type is "used data", the template prefix is "kB (GPRS data usage); offer used:", and the template suffix is "kB (GPRS data usage)";

4: Find the next string (e.g., keyword) "MB", and determine that the corresponding content to be analyzed is "[4]: used data is as follows: 60 MB data usage experience packet from experience zone in online business hall (charged after free experience for 1 month) (intra-zone surfing data usage), 33.978 MB this month", the template prefix is determined through analysis to be "(intra-zone surfing data usage)" and the template suffix "MB this month"; this is determined to be useless information by the analysis of this template prefix. However, a string "used data is as follows:" which can affect the meaning of the whole sentence according to rules, which illustrates that the subsequent expression is information expressing "used data". Therefore, it can be learnt that this template type is "used data."

5. Find the next string "MB." For this string, the template prefix is "(domestic surfing data usage)," the template suffix is "MB used beyond package", and it is analyzed that the template type is "exceeded data usage" according to rules.

6: Find the next string "(MB)". It is then analyzed that the content unit expressed after this sentence is "MB" according to the words before the string "MB", and thus it can be easily analyzed that the template prefix is ", remaining" and the template suffix is ".".

In summary, it is analyzed that the template is as shown in TABLE 1:

TABLE 1

| Template Type | Template Unit | Template Prefix | Template Suffice |
|---|---|---|---|
| Used Data | kB | kB (GPRS data usage); offer used: | kB (GPRS data usage) |
| Used Data | MB | (intra-zone surfing data usage) | MB this month |
| Exceeded Data Usage | MB | (domestic surfing data usage), | MB used beyond package |
| Remaining Data Usage | MB | , remaining | . |

In any event, the flow of method 300 continues as follows:

303: The server sends the obtained data usage template to the client device.

After the server obtains a corresponding data usage template according to the process of the abovementioned operation 302, by way of sending this data usage template to the client device, what is usually changed in subsequent data usage value containing messages received by the client device is digits (e.g., numbers), and therefore, the data usage template can be applied directly to obtain a corresponding data usage values, so that the client device can automatically parse the data usage value according to the data usage template.

304: The client device receives the data usage template sent by the server and parses subsequent data usage value containing messages each time according to that data usage template to obtain a corresponding data usage value.

After receiving the data usage template sent by the server, if the client device sends a query message to the operator again and acquires a new data usage value containing message returned from the operator, the new data usage value containing message can be parsed according to the data usage template sent by the server to obtain the previous corresponding data usage value. That is, the client device only needs to connect to the network to acquire the corresponding data usage template after activating a data usage service when receiving a message containing a data usage value for the first time, and network connection will not be required for a subsequent message containing a data usage value, thus the dependency on the network environment can be reduced and the effect that the data usage value is transparent to the user can be achieved.

It should be noted that for the client device, the received data usage value containing message can also include multiple sets of data usage information instead of one set of data usage information, and the method 300 provided in the abovementioned operation 301 to operation 304 are also applicable to the parsing of a message containing one set of data usage values and multiple sets of data usage values; and the difference from the parsing method for a message containing a single set of data usage values is that when parsing a message containing multiple sets of data usage values, it can be split into two or more messages each containing a single set of data usage values; and after obtaining a data usage template corresponding to each message containing a single set of data usage values by the abovementioned method, the data usage templates corresponding to a plurality of messages containing a single set of data usage values are spliced into one data usage template and the spliced data usage template is used as a data usage template corresponding to the message containing multiple sets of data usage values.

In addition, regardless of whether a message contains a single set of data usage values or a message contains multiple sets of data usage values, after the corresponding data usage template returned by the server is received, the currently received data usage template may not be properly applicable to any subsequently received message containing a data usage value, and therefore, in order to ensure that the client device can normally parse the data usage value, the method 300 also comprises a process that the client device reacquires a new data usage template when the client device cannot parse the data usage value; and the process of the client device acquiring a new data usage template is the same in principle as that of the client device acquiring a data usage template in the abovementioned operation 301 to operation 304; and the process of the server acquiring a new data usage template and sending same to the client device is the same in principle as that of the server acquiring a data usage template and sending same to the client device in the abovementioned operation 301 to operation 304; and reference can be particularly made to the abovementioned operation 301 to operation 304, which are not described again.

It should be noted that when a data usage value is parsed, in addition to the manner that the client device uploads the data usage value containing message to the server and the server generates a data usage template and returns same to the client device according to the abovementioned method, the client device can also independently generate a data usage template, and the manner for generating the data usage template is the same as the manner in which the server generates a data usage template. Thus, reference is made to relevant description of the abovementioned operation 302, the manner of which is employed by the client device to acquire the data usage template.

In the method 300, by analyzing a message containing a data usage value to obtain a corresponding data usage template, a subsequently received message containing a data usage value can be analyzed according to this data usage template without connecting to the network, thus the operation costs can be reduced and the reliability in data usage value parsing can be improved without depending upon the expression of the data usage value from the operator.

Figure 4:
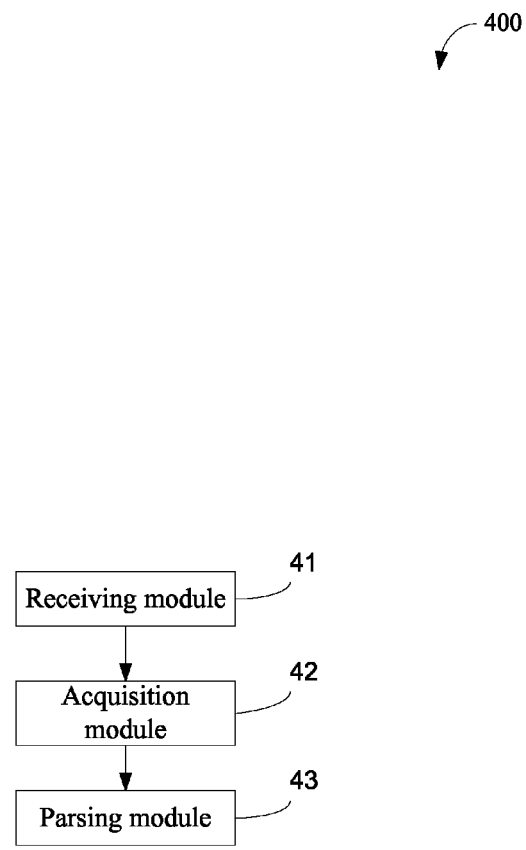
FIG. 4 is a structural schematic diagram of a client device, in accordance with some implementations.

Some implementations provides a client device 400. The client device 400 is used for performing the functions performed by the client device in any of the methods 100/200/300 for parsing a data usage value provided above with reference to FIGS. 1-3. Referring to FIG. 4, the client device 400 comprises:

a receiving module 41 for receiving a message containing a data usage value;

an acquisition module 42 for acquiring a data usage template corresponding to the data usage value containing message received by the receiving module 41; and a parsing module 43 for parsing a subsequently received message containing a data usage value obtained by the acquisition module 42 according to the data usage template, so as to obtain a corresponding data usage value.

Figure 5:
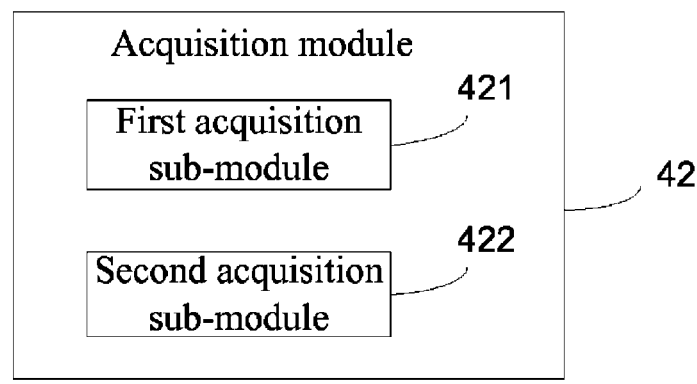
FIG. 5 is a structural schematic diagram of an acquisition module, in accordance with some implementations.

Furthermore, referring to FIG. 5, the acquisition module 42 comprises in particular:

a first acquisition sub-module 421 for analyzing the data usage value containing message to obtain a corresponding data usage template;

alternatively, a second acquisition module 422 for sending the data usage value containing message to a server, so that the server analyzes the data usage value containing message to obtain a corresponding data usage template, and receiving a corresponding data usage template returned by the server.

Figure 6:
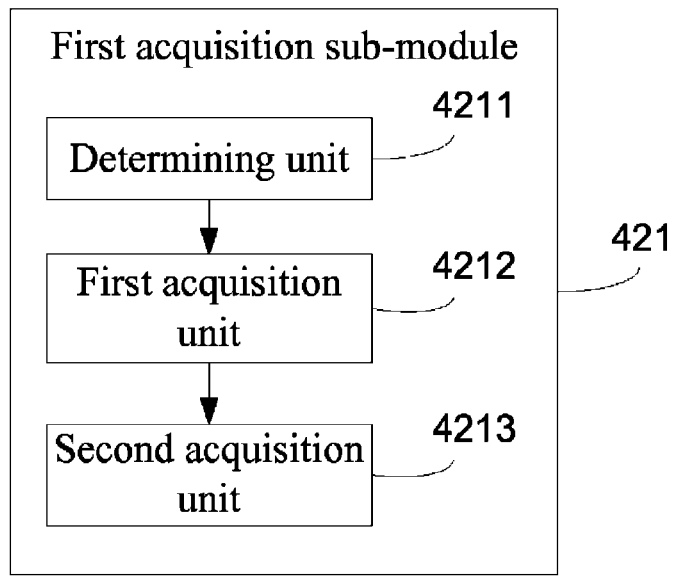
FIG. 6 is a structural schematic diagram of a first acquisition sub-module, in accordance with some implementations.

Referring to FIG. 6, the first acquisition sub-module 421 comprises in particular:

a determining unit 4211 for determining whether or not there is a data usage template matching the data usage value containing message in pre-stored data usage templates;

a first acquisition unit for 4212 for, if the determining unit 4211 determines that there is a data usage template matching the data usage value containing message in the pre-stored data usage templates, using the matching data usage template as the data usage template corresponding to the data usage value containing message; and a second acquisition unit 4213 for, if the determining unit 4211 determines that there is no data usage template matching the data usage value containing message in the pre-stored data usage templates, generating a corresponding data usage template corresponding to the data usage value containing message.

Furthermore, the second acquisition unit 4213 is used for analyzing the data usage value containing message so as to find a string in the data usage value containing message and acquire the location of the string in the data usage value containing message; and obtaining the data usage template by analyzing the string, the location of the string in the data usage value containing message, the contents of strings before and after the string and the locations thereof in the data usage value containing message, with the data usage template at least comprising a template prefix, a template suffix, a template unit and a template type. The template prefix is the content located before the data usage value, the template suffix is the content located after the data usage value, the template unit is the unit of the data usage value, and the template type at least comprises one of remaining data usage, used data usage, and total data usage.

The process of the second acquisition unit 4213 generating a data usage template can refer to the relevant description in operation 302 in the above mentioned method 300.

Figure 7:
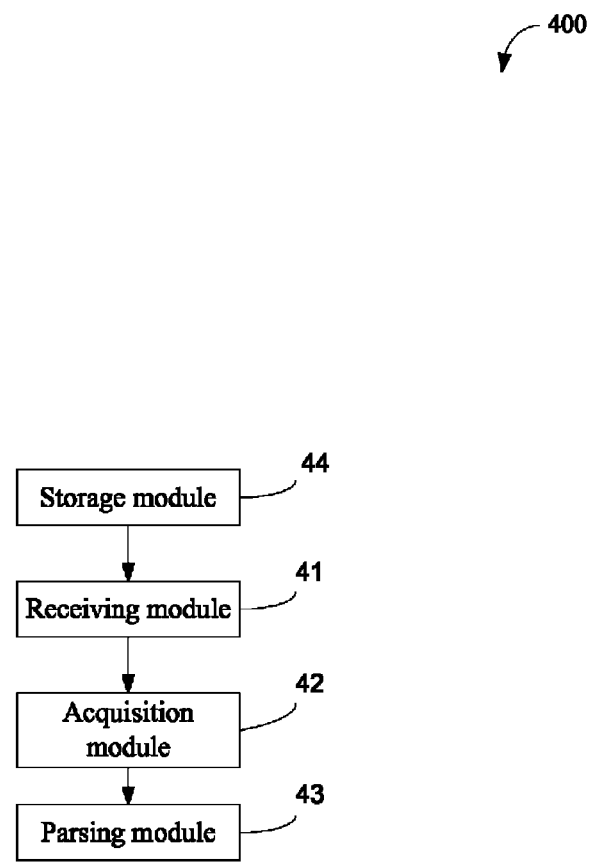
FIG. 7 is a structural schematic diagram of a client device, in accordance with some implementations.

Furthermore, referring to FIG. 7, the client device 400 also comprises:

a storage module 44 for storing the data usage template generated by the second acquisition unit 4213.

Figure 8:
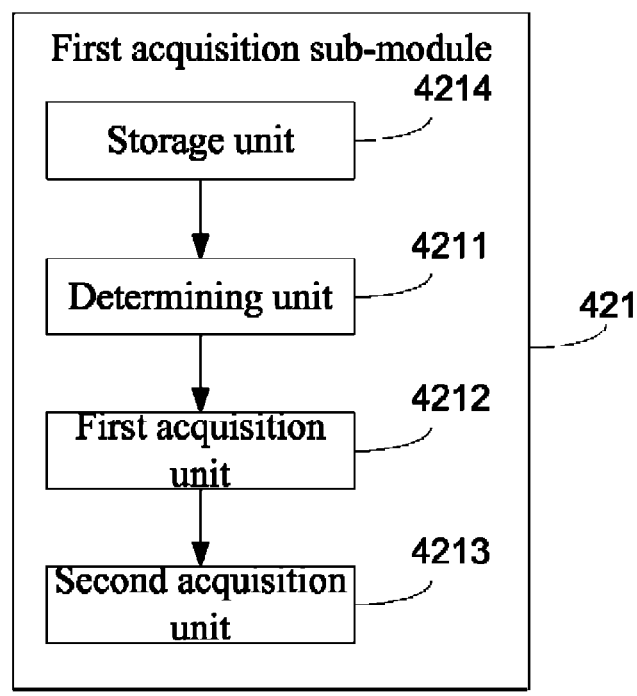
FIG. 8 is a structural schematic diagram of a first acquisition sub-module, in accordance with some implementations.

Furthermore, referring to FIG. 8, the first acquisition module 421 further comprises:

a storage unit 4214 for acquiring from the operator a message sample containing a data usage value and analyzing the message sample to obtain and store the corresponding data usage template.

In the client device 400, by way of analyzing a message containing a data usage value to obtain a corresponding data usage template, a subsequently received message containing a data usage value can be analyzed according to this data usage template without connecting to the network, thus the operation costs can be reduced and the reliability in data usage value parsing can be improved without depending upon the expression of the data usage value from the operator.

Figure 9:
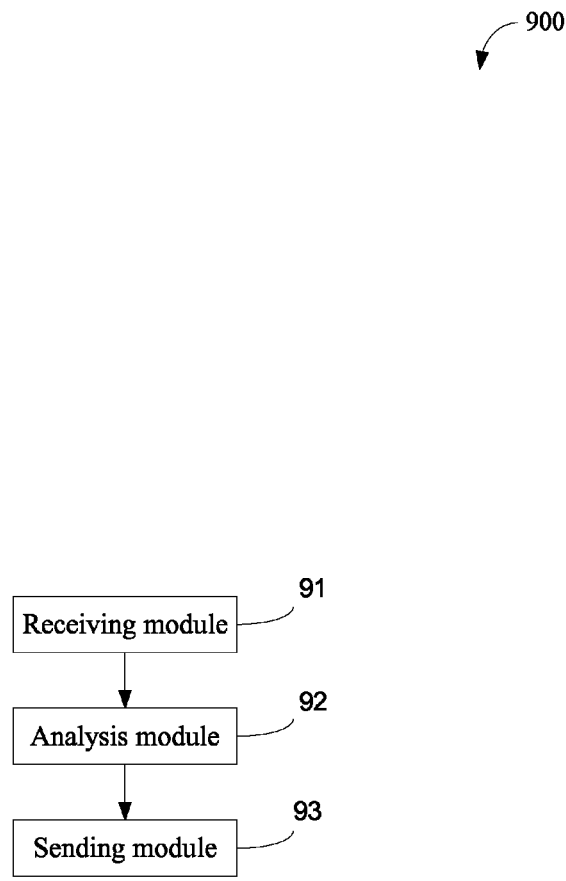
FIG. 9 is a structural schematic diagram of a server, in accordance with some implementations.

Some implementations provide a server 900, which is used for performing the functions performed by the server in any of the methods 100/200/300 for parsing a data usage value provided above. Referring to FIG. 9, the server 900 comprises:

a receiving module 91 for receiving a message containing a data usage value sent by a client device;

an analysis module 92 for analyzing the data usage value containing message received by the receiving module 91 to obtain a corresponding data usage template; and a sending module 93 for sending to the client device the data usage template obtained by the analysis of the analysis module 92, so that the client device parses a subsequently received message containing a data usage value according to the data usage template, so as to obtain a corresponding data usage value.

The process of the receiving module 91 receiving a message containing a data usage value is analogous to operation 301. The process of the analysis module 92 obtaining a corresponding data usage module is analogous to operation 302. The process of the sending module 93 sending a data usage template to the client device is analogous to operation 303.

Figure 10:
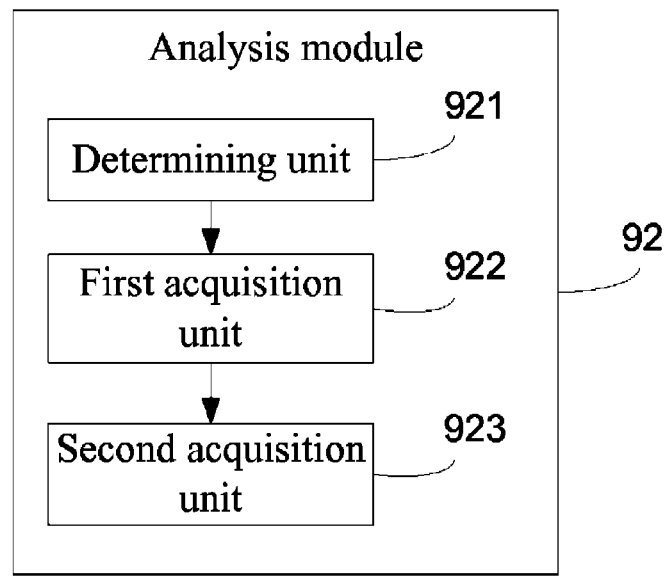
FIG. 10 is a structural schematic diagram of an analysis module, in accordance with some implementations.

Referring to FIG. 10, in some implementations, the analysis module 92 further comprises:

a determining unit 921 for determines whether or not there is a data usage template matching the data usage value containing message in pre-stored data usage templates;

a first acquisition unit 922 for, if the determines unit 921 determines that there is a data usage template matching the data usage value containing message in the pre-stored data usage templates, using the matching data usage template as the data usage template corresponding to the data usage value containing message; and a second acquisition unit 923 for, if the determines unit 921 determines that there is no data usage template matching the data usage value containing message in the pre-stored data usage templates, generating a corresponding data usage template corresponding to the data usage value containing message.

The second acquisition unit 923 is used for analyzing the data usage value containing message so as to obtain a string in the data usage value containing message and acquire the location of the string in the data usage value containing message; and obtaining the data usage template by analyzing the string, the location of the string in the data usage value containing message, the contents of strings before and after the string and the locations thereof in the data usage value containing message, with the data usage template at least comprising a template prefix, a template suffix, a template unit and a template type. The template prefix is the content located before the data usage value, the template suffix is the content located after the data usage value, the template unit is the unit of the data usage value, and the template type at least comprises one of remaining data usage, used data usage, and total data usage.

Figure 11:
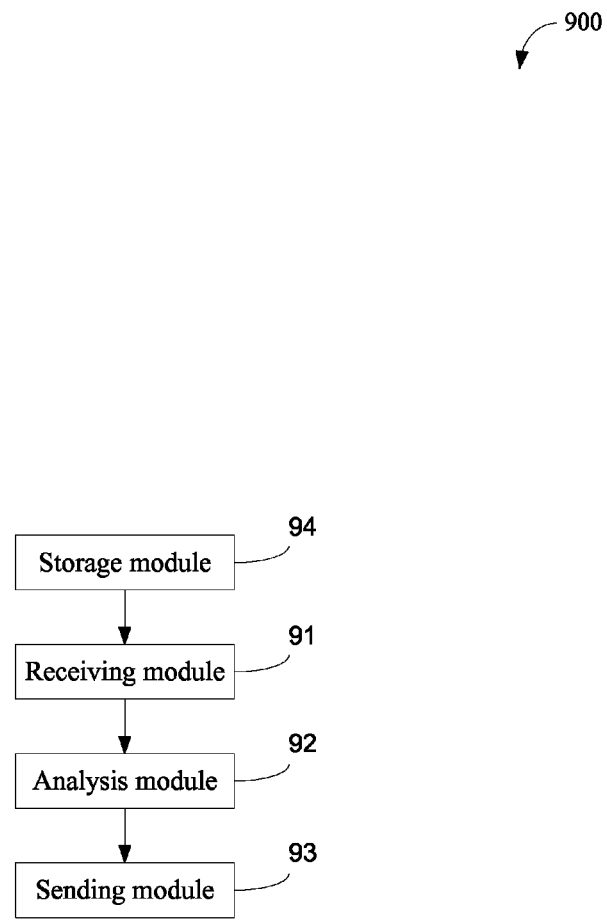
FIG. 11 is a structural schematic diagram of a server, in accordance with some implementations.

Referring to FIG. 11, in some implementations, the server 900 also comprises:

a storage module 94 for storing the data usage template generated by the second acquisition unit 923.

Figure 12:
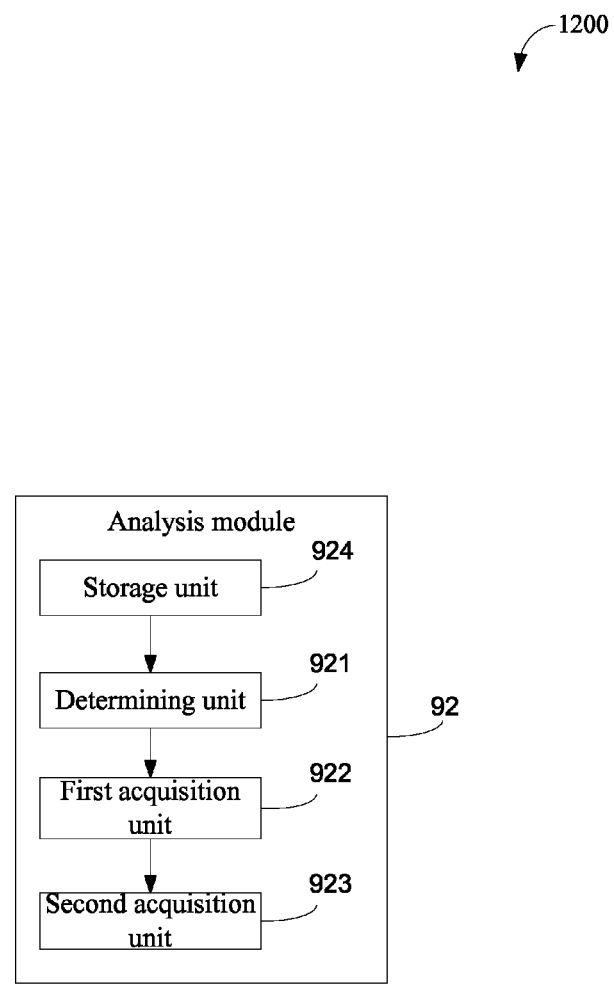
FIG. 12 is a structural schematic diagram of an analysis module, in accordance with some implementations.

Referring to FIG. 12, the analysis module 92 also comprises:

a storage unit 924 for acquiring from the operator a message sample containing a data usage value and analyzing the message sample to obtain and store the corresponding data usage template.

In the server provided in this implementation, by way of analyzing a message containing a data usage value to obtain a corresponding data usage template, a subsequently received message containing a data usage value can be analyzed according to this data usage template without connecting to the network, thus the operation costs can be reduced and the reliability in data usage value parsing can be improved without depending upon the expression of the data usage value from the operator.

Figure 13:
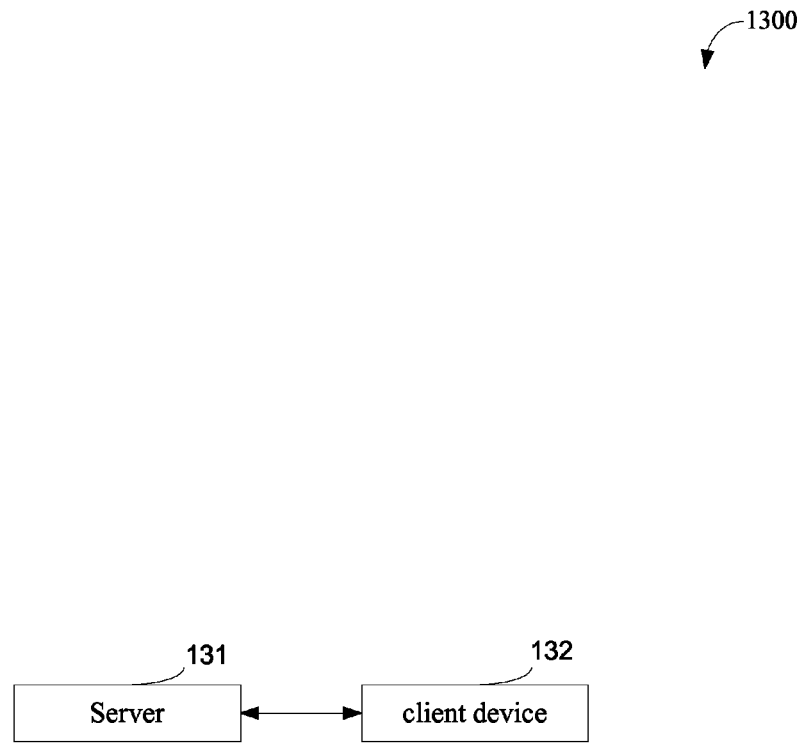
FIG. 13 is a structural schematic diagram of a system for parsing a data usage value, in accordance with some implementations.

Some implementations provide a system 1300 for parsing a data usage value. Referring to FIG. 13, the system 1300 comprises: a server 131 and a client device 132. The server 131 is a server as provided above (e.g., server 900), and the client device 132 is a client device as provided above (e.g., client device 400).

Furthermore, in some implementations, the client device 132 is a device such as a computer, a mobile phone and so on.

In the system 1300, by way of analyzing a message containing a data usage value to obtain a corresponding data usage template, a subsequently received message containing a data usage value can be analyzed according to this data usage template without connecting to the network. Thus the operation costs can be reduced and the reliability of data usage value parsing can be improved without depending upon the expression of the data usage value from the operator.

Figure 14A:
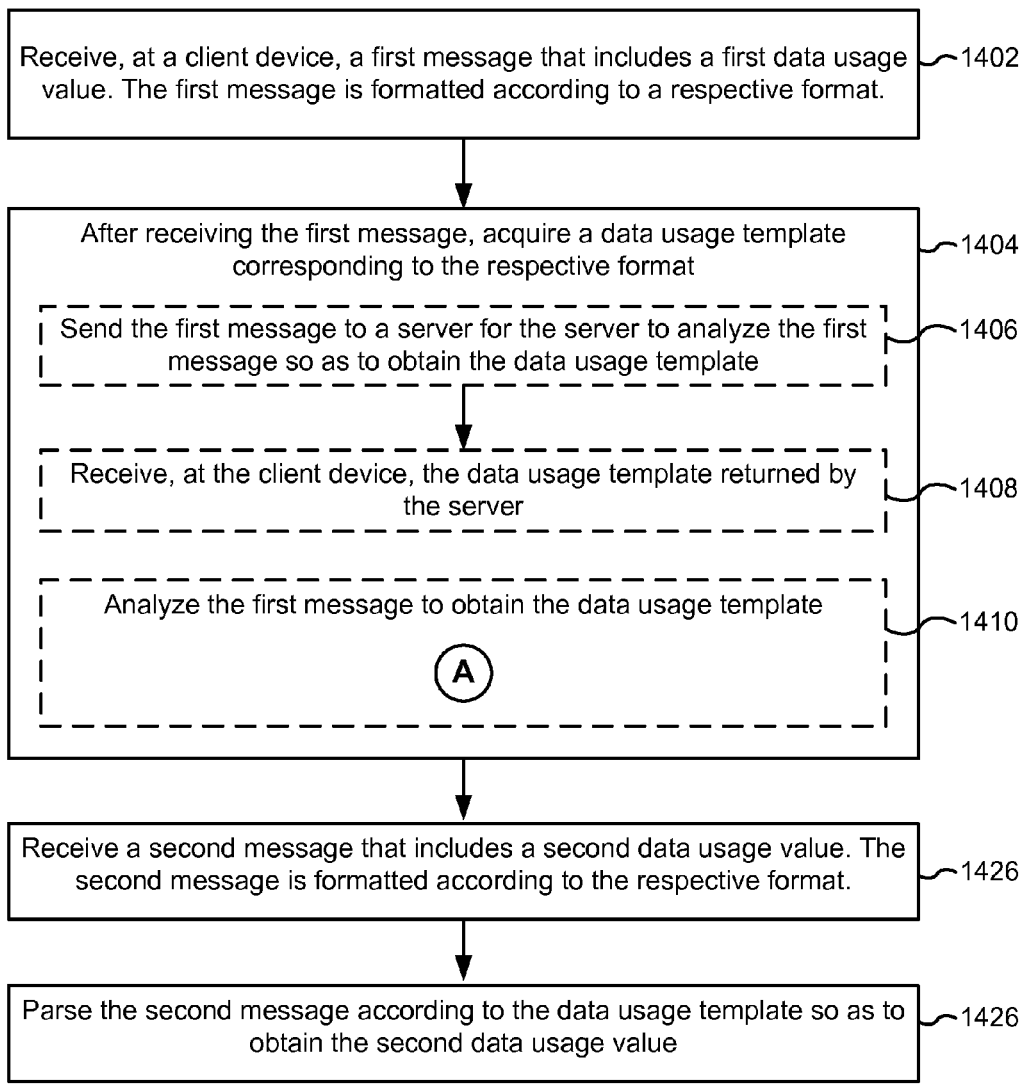
FIGS. 14A-14B is a flow chart of a method for parsing a data usage value, in accordance with some implementations.
Figure 14B:
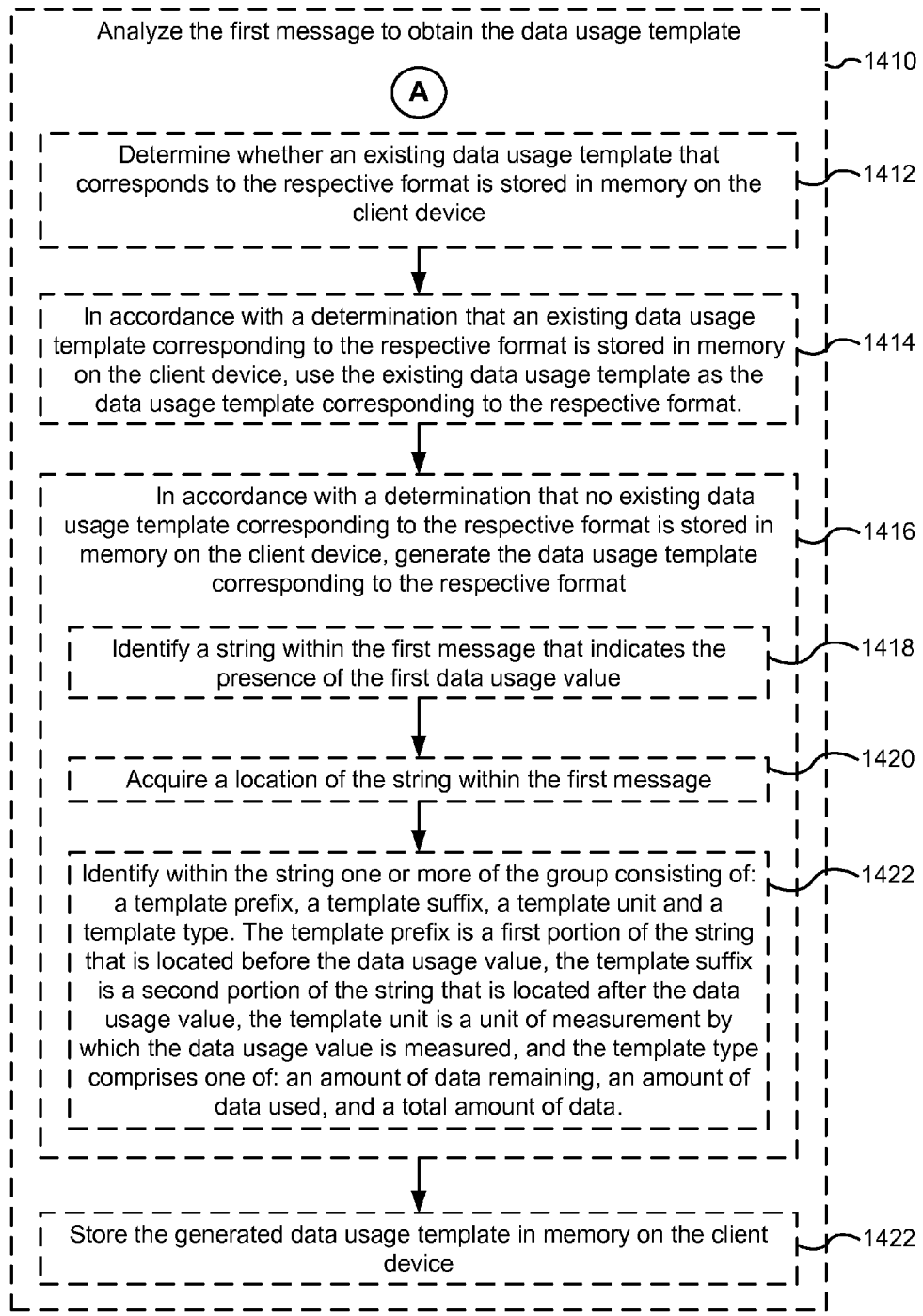

FIGS. 14A-14B is a flow chart of a method 1400 for parsing a data usage value, in accordance with some implementations.

The method includes, receiving (1402), at a client device, a first message that includes a first data usage value. The first message is formatted according to a respective format. After receiving the first message (1404), the client device acquires (1406) a data usage template corresponding to the respective format. In some implementations, in order to acquire the data usage template corresponding to the respective format, the client device sends (1406) the first message to a server for the server to analyze the first message so as to obtain the data usage template. The client device then receives (1408) the data usage template returned by the server.

Alternatively, in some implementations, the client device analyzes (1410) the first message to obtain the data usage template. In order to do so, in some implementations, the client device determines (1412) whether an existing data usage template that corresponds to the respective format is stored in memory on the client device. In accordance with a determination that an existing data usage template corresponding to the respective format is stored in memory on the client device, the client device uses (1414) the existing data usage template as the data usage template corresponding to the respective format (e.g., for the parsing operation 1426 described below). On the other hand, in accordance with a determination that no existing data usage template corresponding to the respective format is stored in memory on the client device, the client device generates (1416) the data usage template corresponding to the respective format.

In some implementations, to generate the data usage template corresponding to the respective format, the client device identifies (1418) a string within the first message that indicates the presence of the first data usage value (e.g., the string includes a keyword such a "MB" or keywords like "data used this month). The client device then acquires (1420) a location of the string within the first message and identifies within the string one or more (e.g., sub-strings) of the group consisting of: a template prefix, a template suffix, a template unit and a template type. The template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data. The client device then stores (1422) the generated data usage template in memory on the client device.

In any event, the client device receives (1426) a second message that includes a second data usage value. The second message is formatted according to the respective format. In some implementations, the client device will repeat operation 1412, but since the client device has already generated the data usage template corresponding to the respective format when the first message was received, the client device will determine that an existing data usage template corresponding to the respective format is stored (e.g., the thus-generated data usage template), and will use that template to parse (1426) the second message according to the data usage template so as to obtain the second data usage value.

Figure 15A:
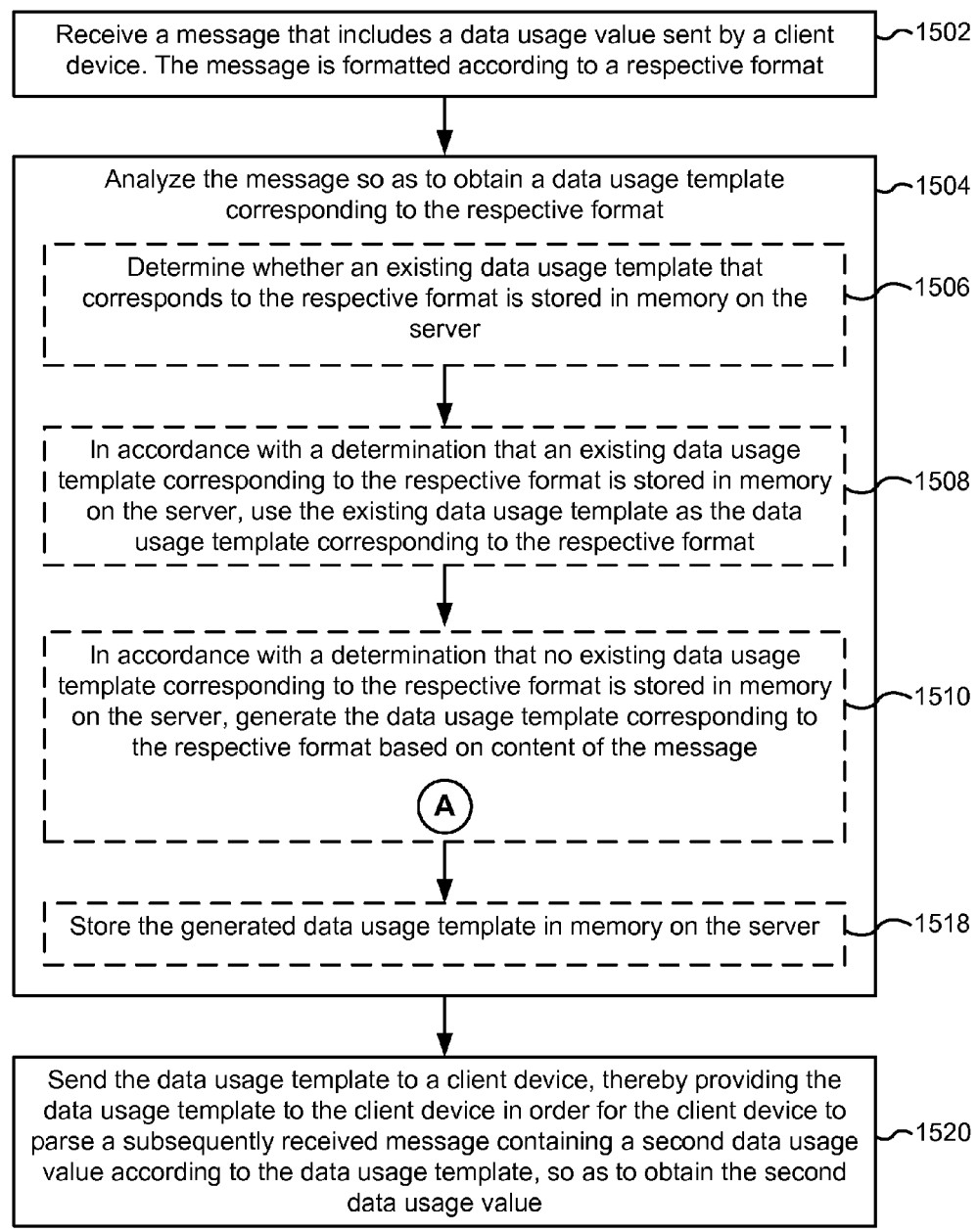
FIGS. 15A-15B is a flow chart of a method for sending a data usage template to a client device, in accordance with some implementations.
Figure 15B:
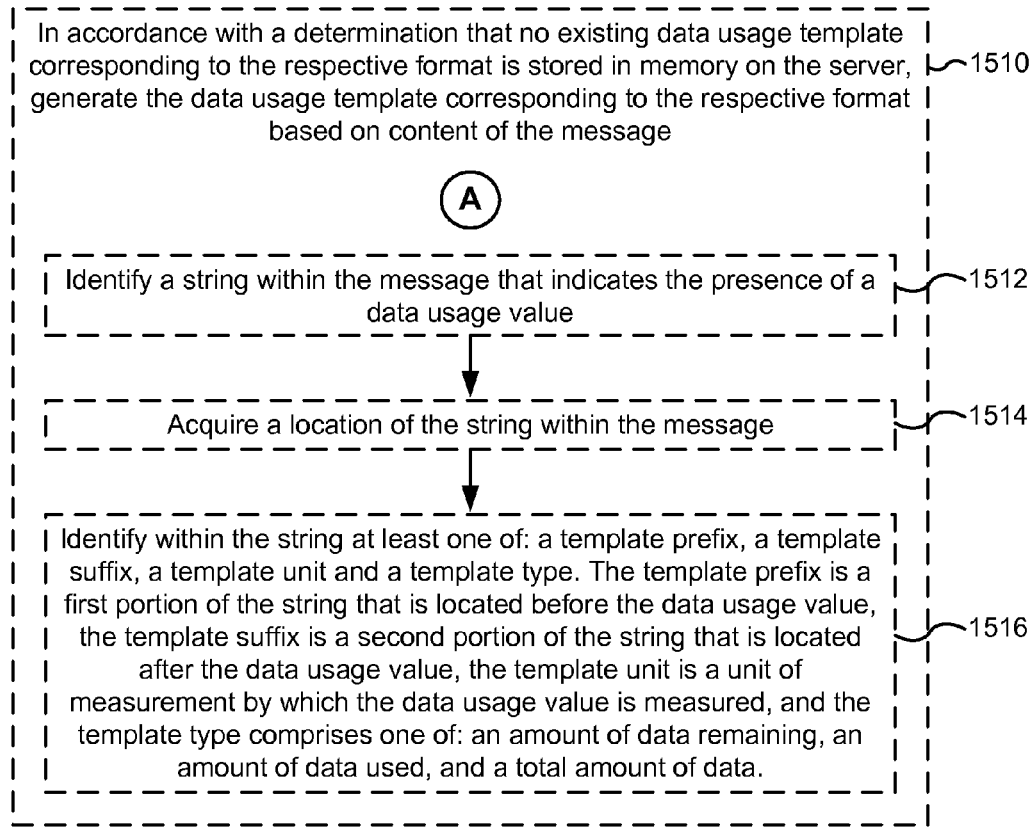

FIGS. 15A-15B is a flow chart of a method 1500 performed at a server system for sending a data usage template to a client device, in accordance with some embodiments.

The method 1500 includes receiving (1502) a message that includes a data usage value sent by a client device, the message being formatted according to a respective format. The server system analyzes (1504) the message so as to obtain a data usage template corresponding to the respective format. In some implementations, the server system determines (1506) whether an existing data usage template that corresponds to the respective format is stored in memory on the server. In accordance with a determination that an existing data usage template corresponding to the respective format is stored in memory on the server, the server system uses (1508) the existing data usage template as the data usage template corresponding to the respective format (e.g., for sending operation XXX described below). On the other hand, in accordance with a determination that no existing data usage template corresponding to the respective format is stored in memory on the server, the server system generates (1510) the data usage template corresponding to the respective format based on content of the message.

In some implementations, the server system identifies (1512) a string within the message that indicates the presence of a data usage value (e.g., the string includes a keyword such a "MB" or keywords like "data used this month). The server system then acquires (1514) a location of the string within the message, and identifies (1516) within the string at least one (e.g., sub-string) of: a template prefix, a template suffix, a template unit and a template type. The template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

The server system then stores (1518) the generated data usage template in memory on the server (e.g., to obviate the need to repeat the analysis operations above for future messages formatted according to the respective format).

The server system then sends (1520) the data usage template to a client device, thereby providing the data usage template to the client device in order for the client device to parse a subsequently received message containing a second data usage value according to the data usage template, so as to obtain the second data usage value.

Figure 16:
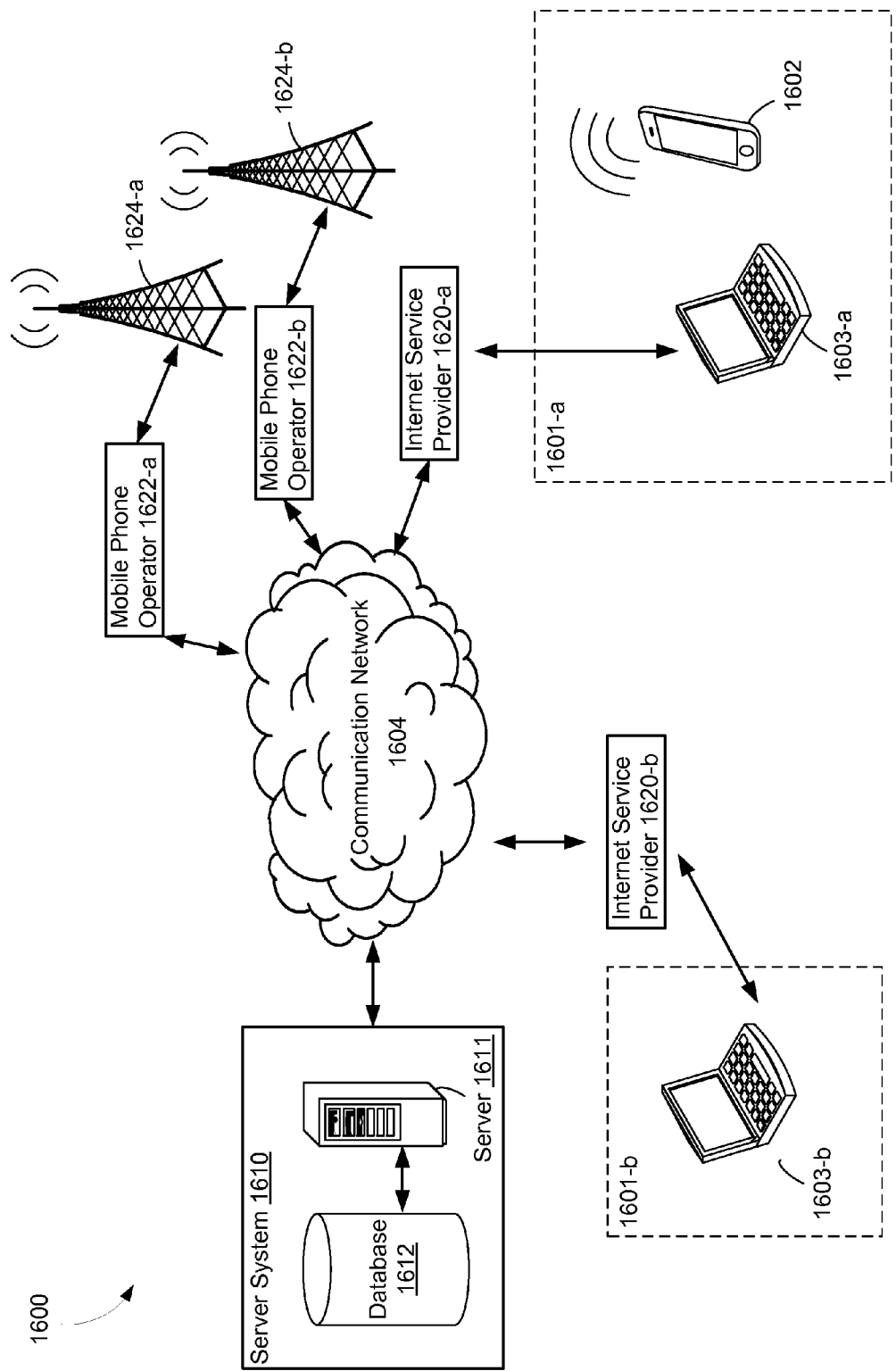
FIG. 16 is a diagram of a client-server environment, in accordance with some implementations.

FIG. 16 is a diagram of a client-server environment 1600 in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 1600 includes a server system 1610, one or more mobile phone operators 1622, one or more internet service providers 1620, and a communications network 1604. Each of the server system 1610, the mobile phone operator 1622 (i.e. wireless carrier), and the Internet service providers 1620 are capable of being connected to the communication network 1604 in order to exchange information with one another and/or other devices and systems. The exchange of information generates traffic for operators 1622 which results in data usage. In some circumstances, the traffic includes messages that include a data usage value (e.g., a report of a user's data usage with a respective operator 1622 or 1620). Within the server system 1610, there is a server computer 1611 for receiving and processing the data received from the client devices 1602 and 1603 (e.g., for analyzing messages containing a data usage value in order to obtain a data usage value template). In some circumstances, a user 1601 (e.g., a single user or a family) may have multiple client devices that share a data usage plan. For example, smart-phone 1602 and laptop 1603 may share a mobile carrier plan with the mobile phone operator 1622-b as well as an internet plan with the internet service provider 1620-a. Within the server system 1610, there is also a database 1612 for storing information (e.g., data usage templates, etc.). Additionally, the mobile phone operator 1622 and the Internet service provider 1620 are operable to connect client devices to the communication network 1604 as well. For example, a smart phone 1602 is operable with the network of the mobile phone operator 1622-a, which includes for example, a base station 1624-a. Similarly, for example, a laptop computer 1603-a (or tablet, desktop, workstation or the like) is connectable to the network provided by a first internet service provider 1620-a, which is ultimately connectable to the communication network 1604. A laptop computer 1603-b (or tablet, desktop, workstation or the like), a different user is connectable to the network provided by a second internet service provider 1620-b, which is ultimately connectable to the communication network 1604. Each of these operators (e.g., mobile phone operators 1622 and internet service providers 1620), or in some cases a respective subset of the operators, may place restrictions on an amount of data that a user may use, for example, in a month (e.g., based on a user's data plan).

The communication network 1604 may be any combination of wired and wireless local area network (LAN) and/or wide area network (WAN), such as an intranet, an extranet, including a portion of the Internet. It is sufficient that the communication network 1604 provides communication capability between client devices and servers. In some implementations, the communication network 1604 uses the HyperText Transport Protocol (HTTP) to transport information using the Transmission Control Protocol/Internet Protocol (TCP/IP). HTTP permits a client device to access various resources available via the communication network 1604. However, the various implementations described herein are not limited to the use of any particular protocol.

Moreover, those skilled in the art will appreciate from the present disclosure that any number of such devices and/or systems may be provided in a client-server environment, and particular devices may be altogether absent. In other words, the client-server environment 1600 is merely an example provided to discuss more pertinent features of the present disclosure.

As discussed below in greater detail with reference to FIG. 18, some client devices, such as the laptop 1603 and smart phone 1602, include a display and a digital camera. In operation, the mobile application (e.g., a client application) may interact with the network and one or more hardware elements (e.g., the digital camera) to facilitate the exchange of messages that generate traffic and therefore data usage. For example, a user using a smart phone 1602 may take a picture with a digital camera of the smart phone and send the picture, with accompanying text via communication network 1604 as an instant message to a distinct instant message account, which will count against the user's data plan.

Figure 17:
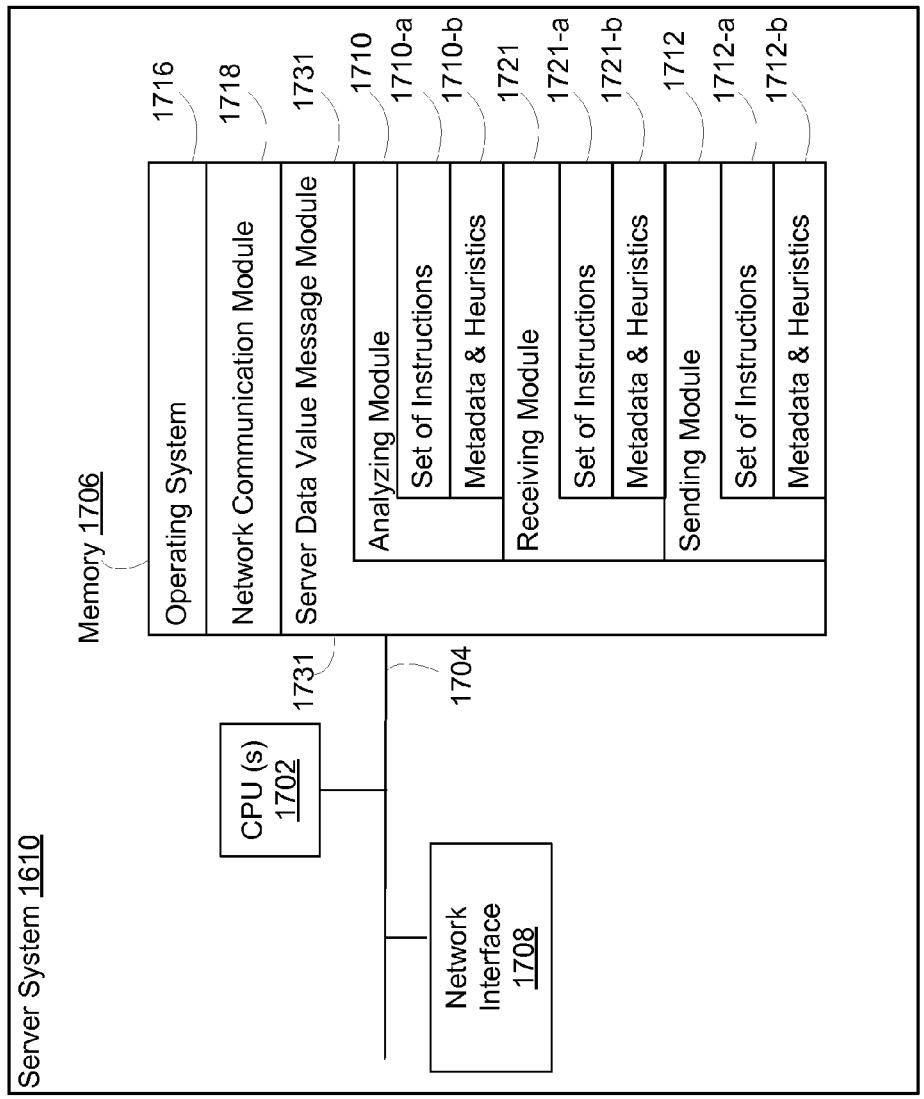
FIG. 17 is a diagram of an example of a server system, in accordance with some implementations.

FIG. 17 is a diagram of an example implementation of a server system 1610, discussed above with reference to FIG. 16, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the server system includes one or more processing units (CPU's) 1702, one or more network or other communications interfaces 1708, memory 1706, and one or more communication buses 1704 for interconnecting these and various other components. The communication buses 1704 may include circuitry (sometimes called a chipset) that interconnects and controls communications between system components. The memory 1706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1706 may optionally include one or more storage devices remotely located from the CPU(s) 1702. The memory 1706, including the non-volatile and volatile memory device(s) within the memory 1706, comprises a non-transitory computer readable storage medium.

In some implementations, the memory 1706 or the non-transitory computer readable storage medium of the memory 1706 stores the following programs, modules and data structures, or a subset thereof including an operating system 1716, a network communication module 1718, and a server data value message module 1731.

The operating system 1716 includes procedures for handling various basic system services and for performing hardware dependent tasks.

The network communication module 1718 facilitates communication with other devices (e.g., other server systems 1611 as well as client devices 1602/1603) via the one or more communication network interfaces 1708 (wired or wireless) and one or more communication networks, such as the internet, other wide area networks, local area networks, metropolitan area networks, and so on.

The server data value message module 1731 is configured to receive (e.g., with receiving module 1721) a message that includes a data usage value sent by a client device, the message being formatted according to a respective format. The server data value message module 1731 is configured to analyze the message (e.g., with analyzing module 1710) so as to obtain a data usage template corresponding to the respective format, and send the data usage template to the client device (e.g., with sending module 1712), thereby providing the data usage template to the client device in order for the client device to parse a subsequently received message containing a second data usage value according to the data usage template, so as to obtain the second data usage value.

To that end, the analyzing module 1710 includes a set of instructions 1710-*a* and heuristics and metadata 1710-*b* (metadata could include, for example, data plan information corresponding to respective users). Similarly, the receiving module 1721 includes a set of instructions 1721-*a* as well as metadata and heuristics 1721-*b*, and sending module 1712 includes a set of instructions 1712-*a* and metadata and heuristics 1712-*b*.

Figure 18:
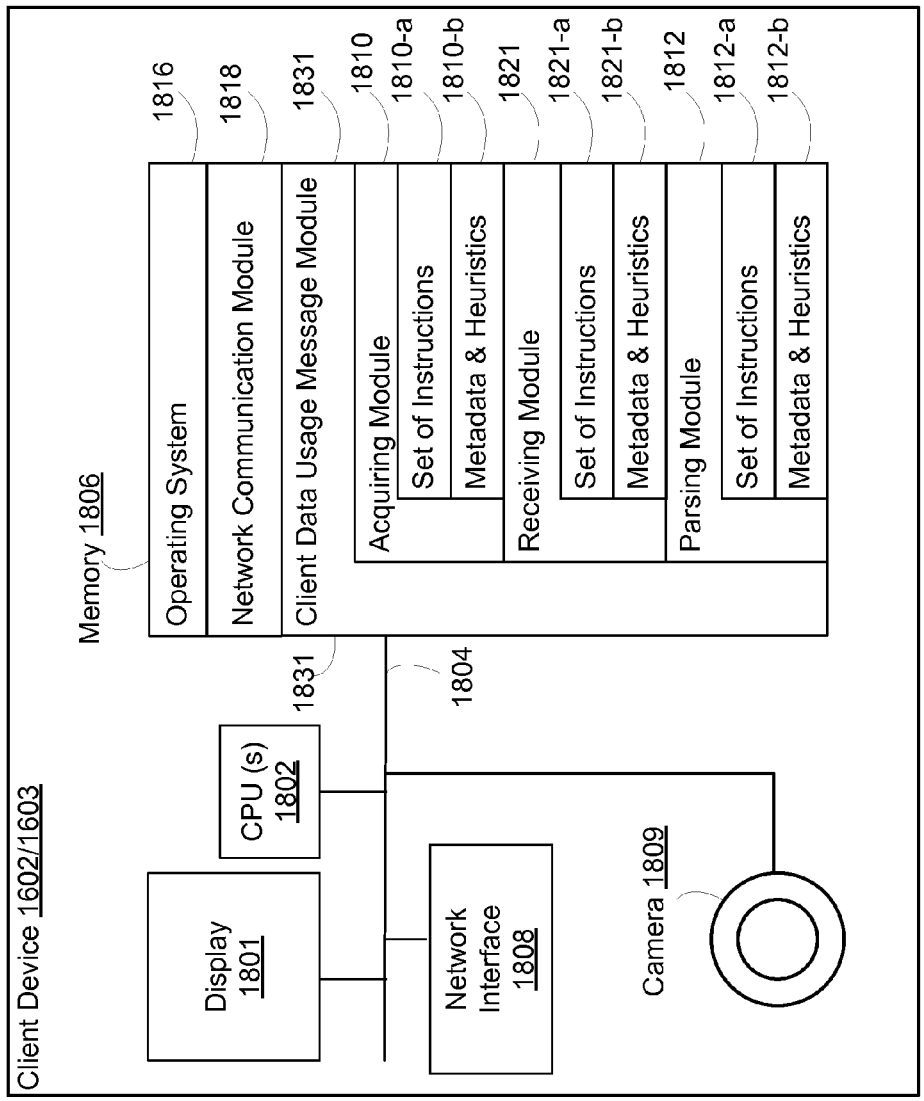
FIG. 18 is a diagram of an example of a client device, in accordance with some implementations.

FIG. 18 is a diagram of an example implementation of a client device 1602/1603 (e.g., laptop 1603 and smart phone 1602), discussed above with reference to FIG. 16, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the client device 1602/1603 includes one or more processing units (CPU's) 1802, one or more network or other communications interfaces 1808, a display 1801, memory 1806, a digital camera 1809, and one or more communication buses 1804 for interconnecting these and various other components. The communication buses may include circuitry (sometimes called a chipset) that interconnects and controls communications between system components. The memory 1806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1806 may optionally include one or more storage devices remotely located from the CPU(s) 1802. The memory 1806, including the non-volatile and volatile memory device(s) within the memory 1806, comprises a non-transitory computer readable storage medium.

In some implementations, the memory 1806 or the non-transitory computer readable storage medium of the memory 1806 stores the following programs, modules and data structures, or a subset thereof including an operating system 1816, a network communication module 1818, and a client data usage message module 1831.

The operating system 1816 includes procedures for handling various basic system services and for performing hardware dependent tasks.

The network communication module 1818 facilitates communication with other devices via the one or more communication network interfaces 1808 (wired or wireless) and one or more communication networks, such as the internet, other wide area networks, local area networks, metropolitan area networks, and so on.

The client data value message module 1831 is configured to receive a first message that includes a first data usage value (e.g., with receiving module 1821), the first message being formatted according to a respective format. After receiving the first message, the client data value message module 1831 is configured to acquire a data usage template corresponding to the respective format (e.g., using acquiring module 1810 to by analyze the message, or alternatively, by send the message to server system 1610 for analysis). The client data value message module 1831 is further configured to receive a second message that includes a second data usage value, the second message being formatted according to the respective format, and parses the second message (e.g., with parsing module 1812) according to the data usage template so as to obtain the second data usage value.

To that end, the acquiring module 1810 includes a set of instructions 1810-*a* and heuristics and metadata 1810-*b* (metadata could include, for example, information that can be used to match an operator to an appropriate data usage template). Similarly, the receiving module 1821 includes a set of instructions 1821-*a* as well as metadata and heuristics 1821-*b*, and parsing module 1812 includes a set of instructions 1812-*a* and metadata and heuristics 1812-*b*.

It should be noted that when the server and client device provided in the abovementioned implementations parse a data usage value, the division of the abovementioned various functional modules are illustrated by way of example, and in practical applications, the abovementioned functions can be completed by being distributed to different functional module as required, that is, the internal structure of a device is divided into different functional modules so as to complete all or part of the abovementioned functions. In addition, the server, client device, and system for parsing a data usage value provided in the abovementioned implementations belong to the same concept of the implementations of the method for parsing a data usage value, and the particular implementation thereof can refer to the implementations of the method, which will not be described here again.

The above disclosures are merely preferred implementations of the present invention, but are not intended to limit the scope of the claims of the present invention. Any equivalent change made according to the claims of the present invention modification still falls within the scope of the present invention.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method, comprising:
   at a client device:
   receiving a first message that includes a first data usage value, wherein the first message is formatted according to a respective format;
   after receiving the first message:
      acquiring a data usage template corresponding to the respective format further comprising analyzing the first message to obtain the data usage template, the analyzing further comprising:
         determining whether an existing data usage template that corresponds to the respective format is stored in memory on the client device;
         in accordance with a determination that an existing data usage template corresponding to the respective format is stored in memory on the client device, using the existing data usage template as the data usage template corresponding to the respective format; and in accordance with a determination that no existing data usage template corresponding to the respective format is stored in memory on the client device, generating the data usage template corresponding to the respective format;

receiving a second message that includes a second data usage value, wherein the second message is formatted according to the respective format; and parsing the second message according to the data usage template so as to obtain the second data usage value;

wherein generating the data usage template corresponding to the respective format comprises:

identifying a string within the first message that indicates the presence of the first data usage value;

acquiring a location of the string within the first message; and identifying within the string one or more of the group consisting of: a template prefix, a template suffix, a template unit and a template type;

wherein the template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

2. The method according to claim 1, further comprising storing the generated data usage template in memory on the client device.

3. The method of claim 1, wherein acquiring the data usage template corresponding to the respective format comprises:

sending the first message to a server for the server to analyze the first message so as to obtain the data usage template; and receiving, at the client device, the data usage template returned by the server.

4. An electronic device, comprising:
one or more processors;
memory; and
one or more programs, wherein the one or more programs are stored in the memory and configured to be executed by the one or more processors, the one or more programs including instructions that when executed by the one or more processors cause the device to:

receive a first message that includes a first data usage value, wherein the first message is formatted according to a respective format;

after receiving the first message:

acquire a data usage template corresponding to the respective format further comprising analyzing the first message to obtain the data usage template, the analyzing further comprising:

determining whether an existing data usage template that corresponds to the respective format is stored in memory on the client device;

in accordance with a determination that an existing data usage template corresponding to the respective format is stored in memory on the client device, using the existing data usage template as the data usage template corresponding to the respective format; and in accordance with a determination that no existing data usage template corresponding to the respective format is stored in memory on the client device, generating the data usage template corresponding to the respective format;

receive a second message that includes a second data usage value, wherein the second message is formatted according to the respective format; and parse the second message according to the data usage template so as to obtain the second data usage value;

wherein generating the data usage template corresponding to the respective format comprises:

identifying a string within the first message that indicates the presence of the first data usage value;

acquiring a location of the string within the first message; and identifying within the string at least one of: a template prefix, a template suffix, a template unit and a template type;

wherein the template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

5. The electronic device of claim 4, the instructions further causing the device to store the generated data usage template in memory on the device.

6. The electronic device of claim 4, wherein the instructions further cause the device to:

send the first message to a server for the server to analyze the first message so as to obtain the data usage template; and receive the data usage template returned by the server.

7. A computer-implemented method, comprising:
at a server:

receiving a message that includes a data usage value sent by a client device, wherein the message is formatted according to a respective format;

analyzing the message so as to obtain a data usage template corresponding to the respective format, the analyzing further comprising:

determining whether an existing data usage template that corresponds to the respective format is stored in memory on the server;

in accordance with a determination that an existing data usage template corresponding to the respective format is stored in memory on the server, using the existing data usage template as the data usage template corresponding to the respective format; and in accordance with a determination that no existing data usage template corresponding to the respective format is stored in memory on the server, generating the data usage template corresponding to the respective format based on content of the message; and sending the data usage template to the client device, thereby providing the data usage template to the client device in order for the client device to parse a subsequently received message containing a second data usage value according to the data usage template, so as to obtain the second data usage value;

wherein generating the data usage template corresponding to the respective format based on content of the message comprises:
identifying a string within the message that indicates the presence of a data usage value; acquiring a location of the string within the message; and
identifying within the string at least one of: a template prefix, a template suffix, a template unit and a template type;
wherein the template prefix is a first portion of the string that is located before the data usage value, the template suffix is a second portion of the string that is located after the data usage value, the template unit is a unit of measurement by which the data usage value is measured, and the template type comprises one of: an amount of data remaining, an amount of data used, and a total amount of data.

8. The method of claim 7, further comprising storing the generated data usage template in memory on the server.

\* \* \* \* \*